United States Patent
van Raalten et al.

(10) Patent No.: US 12,091,516 B2
(45) Date of Patent: Sep. 17, 2024

(54) USE OF CARBON-NANOFIBRES COMPRISING CARBON NETWORKS

(71) Applicant: CarbonX IP 4 B.V., Amsterdam (NL)

(72) Inventors: Rutger Alexander David van Raalten, Amsterdam (NL); Daniela Sordi, Amsterdam (NL)

(73) Assignee: CarbonX IP 4 B.V., Amsterdam (NL)

( * ) Notice: Subject to any disclaimer, the term of this patent is extended or adjusted under 35 U.S.C. 154(b) by 877 days.

(21) Appl. No.: 17/058,138

(22) PCT Filed: May 27, 2019

(86) PCT No.: PCT/EP2019/063626
§ 371 (c)(1),
(2) Date: Nov. 24, 2020

(87) PCT Pub. No.: WO2019/224396
PCT Pub. Date: Nov. 28, 2019

(65) Prior Publication Data
US 2021/0198437 A1 Jul. 1, 2021

(30) Foreign Application Priority Data
May 25, 2018 (EP) .................................. 18174407

(51) Int. Cl.
| | |
|---|---|
| B32B 9/00 | (2006.01) |
| B60C 1/00 | (2006.01) |
| C08J 5/00 | (2006.01) |
| C08J 5/04 | (2006.01) |

(52) U.S. Cl.
CPC .............. C08J 5/005 (2013.01); B60C 1/00 (2013.01); C08J 5/042 (2013.01); C08J 2307/00 (2013.01); C08J 2309/06 (2013.01)

(58) Field of Classification Search
CPC ........ Y10T 428/30; B82Y 30/00; C08J 5/005; C08J 5/042; C08J 2307/00; C08J 2309/06; B60C 1/00
USPC ........................................................ 428/208
See application file for complete search history.

(56) References Cited

U.S. PATENT DOCUMENTS

| | | | |
|---|---|---|---|
| 2005/0170169 A1* | 8/2005 | Watanabe ................ | C08K 7/24 524/495 |
| 2017/0039660 A1 | 2/2017 | Tourigny et al. | |

FOREIGN PATENT DOCUMENTS

| | | |
|---|---|---|
| WO | WO2014/020374 A2 | 2/2014 |
| WO | WO2016/045960 A1 | 3/2016 |
| WO | WO2018/002137 A1 | 1/2018 |

* cited by examiner

*Primary Examiner* — Daniel H Miller
(74) *Attorney, Agent, or Firm* — N.V. Nederlandsch Octrooibureau

(57) ABSTRACT

The invention pertains to the use of porous, chemically interconnected, carbon-nanofibre-comprising carbon networks for reinforcing elastomers. It has been found that said carbon-nanofibre-comprising carbon networks can beneficially be used when added in an amount of 10-120 phr to an elastomer, in particular to styrene-butadiene rubber (SBR). The benefits include lower tan delta at 60° ° C. (rolling resistance), higher tan delta at 0° C. (wet grip), better abrasion resistance, higher flexibility and lower stiffness. The reinforced elastomers can be used in many areas of technology such as tyres, conveyor belts, hoses, etc.

14 Claims, 1 Drawing Sheet

USE OF CARBON-NANOFIBRES COMPRISING CARBON NETWORKS

FIELD OF THE INVENTION

The invention is in the field of reinforcing elastomers, particularly in reinforcing tyres or industrial rubber goods.

BACKGROUND TO THE INVENTION

Elastomers are widely used in many technological applications such as tyres, sealing systems, conveyor systems such as belts, hoses, automotive weather stripping, moulded rubber products, etc. The elastomer market can be subdivided into tyres and industrial rubber goods, in which the key rubber component for general purpose compounds may be nitrile-butadiene rubber (NBR), styrene-butadiene rubber (SBR), ethylene propylene diene monomer rubber (EPDM), and/or natural rubber and for high performance compounds it may be vinylidene fluoride monomer rubbers (FKM), perfluoro-elastomers (FFKM), tetrafluoro ethylene/propylene rubbers (FEPM) and/or hydrogenated nitrile butadiene rubber (HNBR).

Elastomer end-products, such as tyres, often comprise a variety of rubbers mixed with additional chemical and structural components to give the end-product the required properties. For instance a typical car tyre may comprise about 45 wt. % elastomers (such as natural rubber, styrene-butadiene rubber (SBR), polybutadiene rubber (BR), and butyl rubber), about 20% reinforcing agent (such as carbon black and/or silica), about 15% metal, about 5% textile and a variety of additives such as zinc oxide, sulphur, and others. Tyres, such as car tyres, may comprise 30-90 phr or more of carbon black. To improve the properties of tyres, it has been described in EP 2880090 that specific ratios of natural rubber, nanocarbon and carbon black reinforcing agents are beneficial.

Also industrial rubber goods (conveyor belts, fuel hoses) typically comprise a high amount of reinforcing agents such as carbon black and/or silica. An additional requirement here may be the prevention of electrostatic charge build-up that might occur when two non-conductive materials move relative to one another. Any discharge of said electrostatic build-up can lead to various problems or hazards including failure of electronic equipment or fire. These risks can be prevented by including carbon black and thereby making at least one of the materials (semi-)conductive. Also sealing systems usually comprise carbon black. Here there is an additional requirement on the smoothness of the surface. In order to get the best possible seal any imperfection on the surface must be avoided, or at least minimized.

In current technology, carbon black is the predominant reinforcing agent as it is cost effective and also improves the processing of the elastomer. A large amount of research has been devoted to tuning (the production method of) carbon black in order to get optimal results in the end-product. This has led to a variety of carbon black grades that differ in average particle size, specific surface area, porosity, level of impurities, etc. There is still a need to push the performance of elastomers further and to find technology that allows to produce improved elastomers using mass production at an acceptable price point.

In the search for optimizing the properties of the elastomer end-product, it has been found that certain technologically advanced products such as carbon nanotubes can improve the properties of elastomers when included as additive. For instance WO 2016/045960 describes the use of nano-sized carbon structures (nanocarbons such as carbon nanotubes) in the preparation of reinforced (filled) styrene-butadiene rubber (SBR). However, these materials are difficult to produce on large scale. Often these materials are difficult to disperse or are not compatible with some of the other ingredients. Specialized equipment is required to make it work in industrial settings, further compromising throughput.

US2017/369660 describes a carbon nanotube-elastomer composites, the method for producing the composite and the application as seal material. There is mention of a network of tubes which are physically linked, by way of percolation.

There is a need to further develop the properties of elastomers that can be mass-produced in a cost-effective manner and yields better and higher performing end-products. There is a need to make car tyres with lower rolling resistance to reduce fuel consumption and meet the environmental challenges whilst retaining the other essential properties of the tyres. There is also a need to improve the wet grip or snow performance of a tyre whilst keeping the rolling resistance and service life constant.

Similarly there is a need to produce improved elastomers as to make conveyor belts with lower rolling resistance in order to lower operational power consumption as well as high damage resistant belts in order to prevent down-time due to cutting, abrasion, wear and puncture. Also in the area of sealing systems there is a need for better sealing systems that provides for a better sealing properties as well as for improved compression performance (i.e. operational life span) of the rubber compound.

SUMMARY TO THE INVENTION

The inventors have found that a recently developed grade of carbon-nanofibre-comprising carbon networks can be beneficially used to improve the properties of elastomers, to an extent that the above needs in the art can be fulfilled. More specifically it has been found that porous, chemically interconnected, carbon-nanofibre-comprising carbon networks can be used to reinforce elastomers. Reference is made to the experimental parts of the specification. It has been found that these porous, chemically interconnected, carbon-nanofibre-comprising carbon networks having high intraparticle porosity can be used to produce elastomer with high reinforcement. Without wishing to being bound to theory this is believed to be due to the intraparticle porosity of these networks. The strength of elastomers can be improved without the usual drawbacks such as decreased tan delta at 0° C. (wet grip) and/or increased tan delta at 60° C. (rolling resistance) and/or temperature rise in heat build-up which leads to deformation (creep). The reinforced elastomer composite of the invention is very useful in many technological applications such as tyres or industrial rubber goods, such as seals, gaskets, conveyor belts, tubes and the like. It allows to make tyres, such as car tyres, or conveyor belts that have a lower rolling resistance without lowering the wet grip or the service life time.

The carbon networks may comprise crystalline carbon-nanofibres. The carbon-nanofibres may have a length of 30-10,000 nm. Furthermore the carbon networks have intraparticle porosity. The carbon networks of the invention can beneficially be added to elastomers at an inclusion level of 1-60 wt. % or alternatively of 10-120 phr.

The invention furthermore extends to a method to produce said carbon networks largely using conventional kit using a reducing (pyrolysis) or oxidizing (semi or full combustion) carbon black manufacturing process.

EMBODIMENTS OF THE INVENTION

Figure 1A:
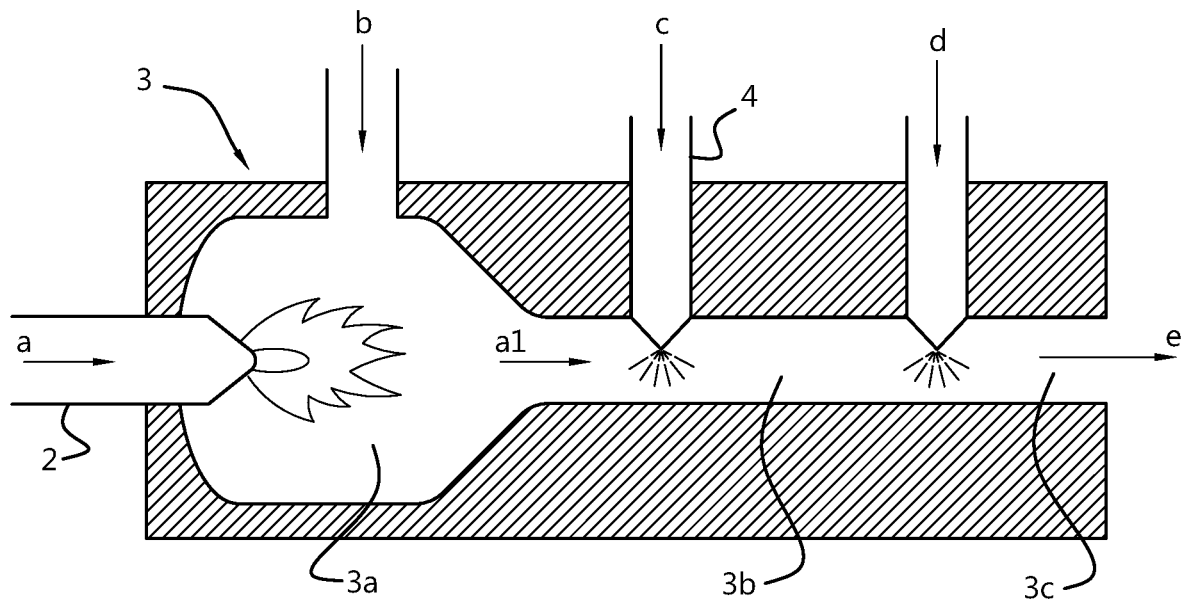
FIG. 1A is a schematic diagram of a continuous furnace carbon black producing process in accordance with the present invention which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying (atomizing) a single-phase emulsion c in the reaction zone 3b containing the hot waste gas, carbonizing said emulsion at increased temperature, and quenching or stopping the reaction in the termination zone 3c by spraying in water d, to obtain crystalline carbon networks e according to the invention.
Figure 1B:
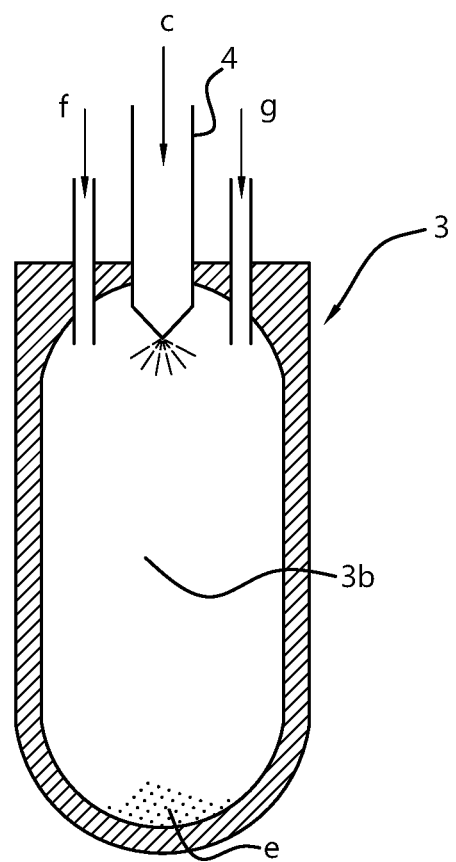
FIG. 1B is a schematic diagram of a semi-batch carbon black producing process where a single-phase emulsion c is atomized through a nozzle 4 at the top of the reactor 3 into the reactor zone 3b at elevated temperatures, carbonizing said emulsion at the elevated temperature in the reactor zone 3b, and collecting the crystalline carbon networks e at the bottom of the reactor. Additionally two gas-inlets are present that enter the reactor from the top, for adding inert gas f, preferably nitrogen for controlling and/or depletion of oxygen-levels, and for introducing a carbon-containing gas g into the reactor, preferably acetylene or ethylene.

1. Use of a porous, chemically interconnected, carbon-nanofibres comprising carbon network for reinforcing elastomers;
2. The use of embodiment 1 wherein the inclusion level of the carbon network in the reinforced elastomer is 1-60 wt. % or 10-120 phr;
3. The use of embodiment 1 or 2 wherein the carbon network comprises crystalline carbon-nanofibres.
4. The use according to any one of the preceding embodiments wherein the carbon network is an intraparticle porous network;
5. The use according to any one of the preceding embodiments wherein the average fibre length of the carbon-nanofibres is 30-10,000 nm;
6. The use according to any one of the previous embodiments wherein the reinforced elastomer is used in tyres or industrial rubber goods;
7. Reinforced elastomer comprising 10-60 wt. % or 10-120 phr of a porous, chemically interconnected, carbon-nanofibre-comprising carbon network;
8. The use according to any one of embodiments 1-6 or the reinforced elastomer of embodiment 7, wherein the reinforced elastomer complies with at least 4, more preferably at least 5, even more preferably at least 6, most preferably all of the following characteristics according to embodiment (a) in the table:

| | Preferred (a) | More preferred (b) | Even more preferred (c) | Most preferred (d) |
|---|---|---|---|---|
| ISO4664-1:2011, tan delta at 0 (° C.) | ≥0.1250 | ≥0.1500 | ≥0.1775 | ≥0.1800 |
| ISO4664-1:2011, tan delta at 60 (° C.) | ≤0.1350 | ≤0.1300 | ≤0.1300 | ≤0.1275 |
| ISO4649:2010, volume loss (mm³) | <115 | <115 | <110 | <110 |
| ISO37:2011, tensile strength at max (MPa) | ≥22 | ≥24 | ≥26 | ≥28 |
| ISO37:2011, elongation at break (%) | ≥350 | ≥400 | ≥450 | ≥475 |
| ISO4666-3:2016, Temperature rise (heat build-up) (° C.) | ≤30 | ≤29 | ≤28 | ≤26 |
| ISO4666-3:2016, creep (%) | ≤3 | ≤2.9 | ≤2.8 | ≤2.6 |

9. The use of any one of embodiment 1-6 and 8, or the reinforced elastomer of any one of embodiments 7-8 wherein the carbon network is obtainable by a process for producing crystalline carbon networks in a reactor 3 which contains a reaction zone 3b and a termination zone 3c, by injecting a water-in-oil or bicontinuous micro-emulsion c comprising metal catalyst nanoparticles, into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce crystalline carbon networks e, transferring these networks e to the termination zone 3c, and quenching or stopping the formation of crystalline carbon networks in the termination zone by spraying in water d;
10. An article of manufacture comprising the reinforced elastomer of any one of embodiments 7-9; and
11. The article of manufacture according to embodiment 10, which is a tyre or industrial rubber good.

DETAILED DESCRIPTION

In a first aspect, the invention can be described as the use of porous, chemically interconnected, carbon-nanofibre-comprising carbon networks (i.e. porous carbon networks which comprise chemically interconnected carbon-nanofibres) for reinforcing elastomers. The skilled person will understand that a porous network refers to a 3-dimensional structure that allows fluids or gasses to pass through.

A porous network may also be denoted as a porous medium or a porous material. The pore volume of the porous carbon networks according to the invention is 0.1-1.5 cm³/g, preferably 0.2-1.5 cm³/g, more preferably 0.3-1.3 cm³/g and most preferably 0.4-1.3 cm³/g as measured using the Brunauer, Emmett, and Teller (BET) method (ASTM D6556-09).

A porous carbon network according to the invention (or a porous carbon network particle of the invention) can be seen as a big molecule, wherein the carbon atoms inherently are covalently interconnected. It is hereby understood that a porous carbon network particle is a particle with chemically interconnected (i.e. covalently bonded) fibers having intraparticle porosity, as opposed to interparticle porosity which refers to a porous network created by multiple molecules or particles and wherein the pores are formed by the space between physically aggregated particles or molecules. In the context of the current invention, intraparticle porosity may also be denoted as intramolecular porosity as the carbon network particle according to the invention can be seen as a big molecule, wherein the pores are embedded. Hence intraparticle porosity and intramolecular porosity have the same meaning in the current text and may be used interchangeable to describe the porous networks of the invention. Compare with traditional carbon black which have no intraparticle porous structure within the carbon black particle, but aggregates of carbon black particles may have interparticle porous properties. While interparticle-intermolecular is space between physical aggregated particles (networks), intraparticle-interparticle is space within the network itself.

Without being bound to a theory, it is believed that the benefit of having a network with intraparticle porosity over a network with interparticle porosity is that the first are more robust and more resilient against crushing and breaking when force is applied. Intraparticle porosity refers to pores existing inside a (nano)particle. Interparticle porosity refers to pores existing as an effect of stacking individual particles The interparticle pores are weaker due to the particle-particle interface and tend to collapse. Intraparticle pores are strong due to the covalently bonded structure surrounding them and can withstand high forces and pressures without collapsing.

As addressed here above, known reinforcing agents, such as carbon black, consist of aggregates or agglomerates of spherical particles that may form a 3-dimensional structure, but without any covalent connection between the individual particles (not 'chemically interconnected'), thus having interparticle porosity. Summarizing, intraparticle porosity refers to the situation wherein the carbon atoms surrounding the pores are covalently connected, wherein interparticle porosity refers to pores residing between particles which are physically aggregated, agglomerated, or the like.

As the network of the invention can be seen as one big molecule, there is no need to fuse particles or parts of the network together. Hence it is preferred that the porous network of chemically interconnected, carbon-nanofibres are non-fused, intraparticle porous, chemically interconnected, carbon-nanofibre-comprising carbon networks, having intraparticle porosity. In a preferred embodiment, the intraparticle pore volume may be characterized as described further below, e.g. in terms of Mercury Intrusion Porosimetry (ASTM D4404-10) or Brunauer, Emmett and Teller (BET) method (ISO 9277:10).

The skilled person will readily understand that the term 'chemically interconnected' in porous, chemically interconnected, carbon-nanofibre-comprising carbon networks implies that the carbon-nanofibres are interconnected to other carbon-nanofibres by chemical bonds. It is also understood that a chemical bond is a synonym for a molecular or a covalent bond. Typically those places where the carbon-nanofibres are connected are denoted as junctions or junctions of fibres, which may thus be conveniently addressed as 'covalent junctions' These terms are used interchangeable in this text. In the carbon networks according to the invention, the junctions are formed by covalently connected carbon atoms. It furthermore follows that the length of a fibre is defined as the distance between junctions which are connected by fibrous carbon material.

At least part of the fibres in the carbon-nanofibre-comprising networks of the invention are crystalline carbon-nanofibres. Preferably at least 20 wt. % of the carbon in the carbon networks in the invention is crystalline, more preferably at least 40 wt. %, even more preferably at least 60 wt. %, even more preferably at least 80 wt. % and most preferably at least 90 wt. %. Alternatively the amount of crystalline carbon is 20-90 wt. %, more preferably 30-70 wt. %, and more preferably 40-50 wt. % compared to the total carbon in the carbon networks of the invention. Here, 'crystalline' has its usual meaning and refers to a degree of structural order in a material. In other words the carbon atoms in the nanofibres are to some extent arranged in a regular, periodic manner. The areas or volumes which are crystalline can be denoted as crystallites. A carbon crystallite is hence an individual carbon crystal. A measure for the size of the carbon crystallites is the stacking height of graphitic layers. Standard ASTM grades of carbon black have a stacking height of the graphitic layers within these crystallites ranging from 11-13 Å (angstroms). The carbon-nanofibre-comprising carbon networks of the invention have a stacking height of at least 15 Å (angstroms), preferably at least 16 Å, more preferably at least 17 Å, even more preferably at least 18 Å, even more preferably at least 19 Å and still more preferably at least 20 Å. If needed the carbon networks with crystallites as large as 100 Å (angstroms) can be produced. Hence the carbon networks of the invention have a stacking height of up to 100 Å (angstroms), more preferably of up to 80 Å, even more preferably of up to 60 Å, even more preferably of up to 40 Å, still more preferably of up to 30 Å. It is therefore understood that the stacking height of graphitic layers within crystallites in the carbon networks of the invention is 15-90 Å (angstroms), more preferably 16-70 Å, even more preferably 17-50 Å, still more preferably 18-30 Å and most preferably 19-25 Å.

The porous, chemically interconnected, carbon-nanofibre-comprising carbon networks may be defined as having chemically interconnected carbon-nanofibres, wherein carbon-nanofibres are interconnected via junction parts, wherein several (typically 3 or more, preferably at least 10 or more) nanofibres are covalently joined. Said carbon-nanofibres are those parts of the network between junctions. The fibres typically are elongated bodies which are solid (i.e. non-hollow), preferably having an average diameter or thickness of 1-500 nm, preferably of 5-350 nm, more preferably up to 100 nm, in one embodiment 50-100 nm, compared to the average particle size of 10-400 nm for carbon black particles. In one embodiment, the average fibre length (i.e. the average distance between two junctions) is preferably in the range of 30-10,000 nm, more preferably 50-5,000 nm, more preferably 100-5,000 nm, more preferably at least 200-5,000 nm, as for instance can be determined using SEM.

The nanofibres or structures may preferably be described in terms of an average aspect ratio of fibre length-to-thickness of at least 2, preferably at least 3, more preferably at least 4, and most preferably at least 5, preferably at most below 50; in sharp contrast with the amorphous (physically associated) aggregates formed from spherical particles obtained through conventional carbon black manufacturing.

The carbon-nanofibre structures may be defined as carbon networks formed by chemically interconnected carbon-nanofibres. Said carbon networks have a 3-dimensional configuration wherein there is an opening between the carbon-nanofibres that is accessible to a continuous phase, which may be a liquid—such as a solvent or an aqueous phase, a gas or any other phase. Said carbon networks are at least 0.5 μm in diameter, preferably at least 1 μm in diameter, preferably at least 5 μm in diameter, more preferably at least 10 μm in diameter, even more preferably at least 20 μm in diameter and most preferably 25 μm in all dimensions. Alternatively said carbon networks are at least 1 μm in diameter in 2 dimensions and at least 5 μm in diameter, preferably at least 10 μm in diameter, more preferably a least 20 μm in diameter and most preferably at least 25 μm in diameter in the other dimension. Here, and also throughout this text, the term dimension is used in its normal manner and refers to a spatial dimension. There are 3 spatial dimensions which are orthogonal to each other and which define space in its normal physical meaning. It is furthermore possible that said carbon networks are at least 10 μm in diameter in 2 dimensions and at least 15 μm in diameter, preferably at least 20 μm in diameter, more preferably a least 25 μm in diameter, more preferably at least 30 μm in diameter and most preferably at least 50 μm in diameter in the other dimension.

The carbon-nanofibre-comprising carbon networks may have a volume-based aggregate size as measured using laser diffraction (ISO 13320) or dynamic light scattering analysis of 0.1-100 μm, preferably 1-50 μm, more preferably 4-40 μm, more preferably of 5-35 μm, more preferably of 6-30 μm, more preferably of 7-25 μm and most preferably of 8-20 μm.

The carbon-nanofibre-comprising carbon networks may have an intraparticle pore diameter size as measured using Mercury Intrusion Porosimetry (ASTM D4404-10) of 5-150 nm, preferably 10-120 nm, and most preferably of 10-100 nm.

The carbon-nanofibre-comprising carbon networks may have an intraparticle volume as measured using Mercury Intrusion Porosimetry (ASTM D4404-10) of 0.10-1.1 cm$^3$/g, preferably 0.51-1.0 cm$^3$/g, and most preferably of 0.59-0.91 cm$^3$/g.

The surface area of the carbon-nanofibre-comprising carbon networks as measured according to the Brunauer, Emmett and Teller (BET) method (ISO 9277:10) is preferably in the range of 40-120 m$^2$/g, more preferably 45-110 m$^2$/g, even more preferably 50-100 m$^2$/g and most preferably 50-90 m$^2$/g.

The porous, chemically interconnected, carbon-nanofibre-comprising carbon networks may also comprise carbon black particles built in as part of the network. These particles are profoundly found at the junctions between carbon-nanofibres, but there may also be carbon black particles present at other parts of the network. The carbon black particles preferably have a diameter of at least 0.5 times the diameter of the carbon-nanofibres, more preferably at least the same diameter of the carbon-nanofibres, even more preferably at least 2 times the diameter of the carbon-nanofibres, even more preferably at least 3 times the diameter of the carbon-nanofibres, still more preferably at least 4 times the diameter of the carbon-nanofibres and most preferably at least 5 times the diameter of the carbon-nanofibres. It is preferred that the diameter of the carbon black particles is at most 10 times the diameter of the carbon-nanofibres. Such mixed networks are denoted as hybrid networks.

The porous, chemically interconnected, carbon-nanofibre-comprising carbon networks have a functionalized surface. In other words, the surface comprises groups that alter the hydrophobic nature of the surface—which is typical for carbon—to a more hydrophilic nature. The surface of the carbon networks comprises carboxylic groups, hydroxylic groups and phenolics. These groups add some polarity to the surface and may change the properties of the compound material in which the functionalized carbon networks are embedded. Without wishing to be bound to a theory, it is believed that the functionalized groups bind to the elastomer, for instance by forming H-bonds, and therefore increase the resilience of the materials. Hence at least the stiffness and the durability of the material are altered which may result in lower rolling resistance and increased operational life span of the reinforced elastomer, in particular of tyres or conveyor belts comprising said reinforced elastomer.

The porous, chemically interconnected, carbon-nanofibre-comprising carbon networks may comprise metal catalyst nanoparticles. These are a fingerprint of the preparation method. These particles may have an average particle size between 1 nm and 100 nm. Preferably said particles are monodisperse particles having deviations from their average particle size which are within 10%, more preferably within 5%. Non-limiting examples of nanoparticles included in the carbon-nanofibre-comprising carbon networks are the noble metals (Pt, Pd, Au, Ag), iron-family elements (Fe, Co and Ni), Ru, and Cu. Suitable metal complexes may be (i) platinum precursors such as $H_2PtCl_6$; $H_2PtCl_6 \cdot xH_2O$; $K_2PtCl_4$; $K_2PtCl_4 \cdot xH_2O$; $Pt(NH_3)_4(NO_3)_2$; $Pt(C_5H_7O_2)_2$, (ii) ruthenium precursors such as $Ru(NO)(NO_3)_3$; $Ru(dip)_3Cl_2$ [dip=4,7-diphenyl-1,10-fenanthroline]; $RuCl_3$, or (iii) palladium precursors such as $Pd(NO_3)_2$, or (iv) nickel precursors such as $NiCl_2$ or $NiCl_2 \cdot xH_2O$; $Ni(NO_3)_2$; $Ni(NO_3)_2 \cdot xH_2O$; $Ni(CH_3COO)_2$; $Ni(CH_3COO)_2 \cdot xH_2O$; $Ni(AOT)_2$ [AOT =bis(2-ethylhexyl)sulphosuccinate], wherein x may be any integer chosen from 1, 2, 3, 4, 5, 6, 7, 8, 9 or 10 and typically may be 6, 7 or 8.

The porous, chemically interconnected, carbon-nanofibre-comprising carbon networks are preferably obtainable by the process for the production of crystalline carbon networks in a reactor 3 which contains a reaction zone 3b and a termination zone 3c, by injecting a water-in-oil or bicontinuous micro-emulsion c comprising metal catalyst nanoparticles, into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce crystalline carbon networks e, transferring these networks e to the termination zone 3c, and quenching or stopping the formation of crystalline carbon networks in the termination zone by spraying in water d.

In a more preferred embodiment, the networks are obtainable by the above process, said reactor being a furnace carbon black reactor 3 which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying a water-in-oil or bicontinuous micro-emulsion c comprising metal catalyst nanoparticles, in the reaction zone 3b containing the hot waste gas, carbonizing said emulsion at a temperature of above 600° C., preferably above 700° C., more preferably above 900° C., even more preferably above 1000° C., more preferably above 1100° C., preferably up to 3000° C., more preferably up to 2500° C., most preferably up to 2000° C., and quenching or stopping the reaction in the termination zone 3c by spraying in water d, to yield crystalline carbon networks e.

The networks are preferably obtainable by the above process wherein further processing details are provided in the section headed "Process for obtaining carbon-nanofibre-comprising carbon networks" here below, and in FIG. 1A.

The term elastomer is a combination of elastic and polymer. It refers to a material having viscoelastic properties. This behaviour combines viscous behaviour—the material shows an amount of resistance to deformation on application of a stress—with elastic behaviour—the material deforms when a stress is applied and returns to its original shape when the stress is removed. It is customary to denote elastomers as rubbers. These terms are interchangeable and are used without distinction in this text, as in the field. Elastomers can be crosslinked to promote their elastic behaviour and reduce the viscous behaviour. For example, rubbers such as butadiene rubbers and styrene-butadiene rubbers (SBR) can be vulcanized. For the purposes of the present invention, the term "elastomeric matrix" is intended to mean all of the elastomers (or rubbers) of the rubber composition. Thus, the elastomeric matrix may in particular be constituted by a single elastomer, but also by a blend of two or more elastomers.

A reinforced elastomer refers to an elastomer comprising an elastomeric matrix supplemented with a reinforcing material such as a reinforcing filler. Said reinforcing material enhances the properties of the elastomer, such as abrasion resistance and fatigue life in general as well as rolling resistance, wet traction, snow performance, wear resistance and operational life span for the case of tyres. Examples of reinforcing filler include carbon black and reinforcing mineral fillers such as those of the siliceous type—in particular silica ($SiO_2$)—or of the aluminous type—in particular alumina ($Al_2O_3$). The silica used may be any reinforcing silica known to those skilled in the art, in particular any precipitated or fumed silica having a BET specific surface area and a CTAB specific surface area which are both less than 450 $m^2/g$, preferably from 30 to 400 $m^2/g$.

The carbon networks of the invention function as reinforcing material. The amount of the porous, chemically interconnected, crystalline, carbon-nanofibre-comprising carbon networks within the reinforced elastomer is 1-60 wt. %, preferably 10-55 wt. %, more preferably 20-50 wt. %, even more preferably 30-50 wt. %, even more preferably 35-45 wt. %. Here wt. % is defined in its usual meaning and refers to the percentage by mass or the mass fraction normalized to 100%. It is defined as the amount of the specific chemical (here carbon-nanofibre-comprising carbon networks) divided by the sum of all chemicals (here the elastomer including all added materials) and multiplied by 100%. It is generally accepted that 100% refers to all the material making up the reinforced elastomer.

Alternatively the amount of the porous, chemically interconnected, crystalline, carbon-nanofibre structures in the reinforced elastomer can be 10-120 phr, preferably 15-60 phr, more preferably 20-50 phr, even more preferably 30-50 phr, and even more preferably 40-50 phr. Here phr refers to parts per hundred rubber which is a generally accepted measure in the rubber industry used to indicate the composition of the rubber. Here all ingredients are quantified as parts by weight per 100 parts by weight of elastomer. The total is hence more than 100. For instance a typical rubber might comprise 100 phr rubber, 50 phr carbon black, 30 phr lubricant and 20 phr additional additives. In this case the inclusion level of carbon black is 50 phr or 25 wt. %.

If desired the porous, chemically interconnected, carbon-nanofibre-comprising carbon networks can be mixed with other (conventional) reinforcing fillers. For instance an elastomer might be reinforced by including 10-40 phr of carbon black and 10-40 phr of porous, chemically interconnected, carbon-nanofibre-comprising carbon networks, more preferably 20-30 phr of carbon black and 20-30 phr of porous, chemically interconnected, carbon-nanofibre-comprising carbon networks. Other reinforcing fillers may be added such as an additional 5-25 phr of silica, an additional 5-25 phr of alumina, or both.

Any carbon black suitable for reinforcing natural rubber may be used in addition to the carbon-nanofibre-comprising carbon networks for reinforcing elastomers. Non-limiting examples of suitable carbon black include: super abrasion furnace (SAF N110), intermediate SAF 1N220, high abrasion furnace (HAF N330), easy processing channel (EPC N300), fast extruding furnace (FEF N550), high modulus furnace (HMF N683), semi-reinforcing furnace (SRF N770), fine thermal (FT N880), and medium thermal (MT N990).

Any precipitated silica suitable for reinforcing natural rubber may be used in addition to the carbon-nanofibre-comprising carbon networks for reinforcing elastomers. Non-limiting examples of suitable precipitated silica include the Ultrasil 7000 and Ultrasil 7005 silica's from Evonik, Zeosil 1165MP, 1135MP and 1115MP silica's from Rhodia, Hi-Sil EZ150G silica from PPG, and Zeopol 8715, 8745 and 8755 silica's from Huber. When silica is incorporated into an elastomer, it is typically beneficial to also include a silane coupling agent.

The reinforcing materials such as the networks may be mixed into the elastomeric matrix when it is in a malleable or liquid-like state until they are evenly dispersed into said elastomeric matrix. To facilitate transport and handling, these reinforcing materials may be made into pellets, micropearls, beads, granules or any other appropriate densified form.

If needed a coupling agent may be used to provide a strong bond between the reinforcing filler and the elastomer. The use of such an agent is especially common in combination with fillers of the siliceous type, but may in principle be beneficially used with any mineral filler. Examples of such coupling fillers include mercapto-functional silanes as well as polysulfide bis-alkoxysilanes.

In addition to reinforcing fillers that are primarily added to boost the properties of the elastomer and have as an additional benefit the limitation of the costs of the end-product, it may also be beneficial to add an inert filler. Said inert filler does not reinforce the elastomer and is thus only added to limit or reduce the costs of the end-product. The inclusion level of inert filler may be 0-40 wt. %, preferably between 10 and 35 wt. %, and more preferably between 20 and 30 wt. %. Or the inclusion level may be 0-80 phr, preferably between 20 and 70 phr, and more preferably between 40 and 60 phr. Determination of the exact levels and choice for filler are considered to fall with the skilled person's ambit. The inert filler(s) that can be used according to the invention may be selected from chalk, clay, bentonite, talc, kaolin, glass microbeads, glass flakes, and a mixture of these compounds. Preferably, the inert filler is chalk. The chalk may be in the form of particles having a mean size (by weight) which is greater than 1 μm. The median size of the chalk particles is preferentially between 0.1 and 200 μm, more particularly between 0.5 and 30 μm and even more preferentially between 1 and 20 μm. The chalks known to those skilled in the art are natural calcium carbonates (chalk) or synthetic calcium carbonates with or without coating (for example with stearic acid).

The elastomer that is reinforced according to the invention may be any elastomer. Preferably the use of porous, chemically interconnected, crystalline, carbon-nanofibres structures is for reinforcing butadiene rubbers, most preferably for reinforcing styrene-butadiene rubber (SBR), ethylene propylene diene monomer rubber (EPDM), natural rubber (NR), vinylidene fluoride monomer rubbers (FKM), perfluoro-elastomers (FFKM) and tetrafluoro ethylene/propylene rubbers (FEPM), or combinations thereof. Preferably the elastomer(s) is or comprises a butadiene rubber, ethylene propylene diene monomer rubber (EPDM), natural rubber (NR), vinylidene fluoride monomer rubbers (FKM), perfluoro-elastomers (FFKM) and/or tetrafluoro ethylene/propylene rubbers (FEPM). More preferably the elastomer comprises styrene-butadiene rubber (SBR) and even more preferably the elastomer is styrene-butadiene rubber (SBR).

If beneficial the reinforced elastomer may comprise additional ingredients. For instance the reinforced elastomer may comprise a curing agent. In a sulphur-cured or vulcanized rubber, it may be beneficial to introduce a sulphur donor. Alternatively peroxides or fluorocarbons may be used. In addition an activator that facilitates the curing may be added. In sulphur-cured or vulcanized rubbers, zinc oxide and stearic acid are typical activators. The reinforced elastomer with activator may also comprise an accelerator such as N-tert-butyl-2-benzothiazyl sulfenamide (TBBS) to speed up the curing.

In case that it is desired that the end-product is a foam, a blowing agent such as (sodium) bicarbonate may be introduced into the elastomer. Or, in the opposite case where air pockets or bubbles are not wanted, a desiccant may be added to remove any remaining traces of water.

Should the end-product be a bonded composite, such as a tyre, hose or a belt, it might be beneficial to include a bonding agent. Suitable bonding agents may include cobalt-based salts such as cobalt naphthenate or cobalt stearate as well as proprietary materials based on cobalt and boron complexes.

In case that it is beneficial to improve low-temperature flexibility of the elastomer, a plasticiser may be added. If desired the elastomer can be rendered flame resisting by adding a flame retarding agent. The use of porous, chemically interconnected, carbon-nanofibre-comprising carbon networks for reinforcing elastomers results in high quality elastomer that is very suitable for use in car tyres or other automotive products, as well as in industrial rubber products such as conveyor belt, hoses, rubber linings, bridge bearing pads, anti-vibration mounting. Also said elastomers may be used as footwear, soles and/or door mats.

Application

The above described use of porous, chemically interconnected, carbon-nanofibre-comprising carbon networks (or worded differently, porous carbon networks which comprise chemically interconnected carbon-nanofibres) for reinforcing elastomers yields very high performing reinforced elastomers that can suitably be used in many applications. The invention can therefore also be described as reinforced elastomer comprising porous, chemically interconnected, carbon-nanofibre-comprising carbon networks, wherein the inclusion level of porous, chemically interconnected, carbon-nanofibre-comprising carbon networks is 1-60 wt. %, preferably 10-55 wt. %, more preferably 20-50 wt. %, even more preferably 30-50 wt. %, even more preferably 35-45 wt. %. Alternatively the inclusion level of the porous, chemically interconnected, crystalline, carbon-nanofibre structures can described as 10-120 phr, preferably 10-60 phr, more preferably 20-50 phr, even more preferably 30-50 phr, and even more preferably 40-50 phr. The networks may be further characterized in terms of crystallinity and intraparticle porosity as detailed here above.

The reinforced elastomer of the invention is particularly suitable for use in the manufacture of tyres and/or industrial rubber goods. Hence the invention extends to tyres and/or industrial rubber goods comprising reinforced elastomer comprising porous, chemically interconnected, carbon-nanofibre-comprising carbon networks. Here a tyre may be a car tyre, such as a summer car tyre or a winter car tyre, a truck tyre, a tyre for a bicycle or a motorbike or any other tyre. An industrial rubber good may refer to conveyor belts, tubes, sealing systems and the likes. The reinforced elastomer of the invention can be used in all parts of the tyre or the industrial rubber good. It is particularly suitable for use in the tread of the tyre, i.e. that part of the tyre that is in contact with the road. In a particularly preferred embodiment a tyre according to the invention comprises reinforced styrene-butadiene rubber. Said tyres with reinforced elastomer according to the invention in the tread have superior properties compared to tyres having a tread comprising merely carbon black and/or silica.

The properties of the tyres according to the invention can be tuned to decrease the rolling resistance without compromising the wet grip or the tread wear/wear resistance/operational life span. Or if desired, the tyres can be tuned to increase the wet grip without compromising flexibility or stiffness. Alternatively a tyre according to the invention can be tuned to yield superior properties as snow tyre without compromising the wet grip. Such a tyre may even have an improved wet grip along with an improved elongation and a reduced stiffness which make it suitable as snow tyre. Reference is made to example 1. Without wishing to be tied down to any theory, the improvements may be linked to the networks exhibiting low deformation (creep and compression).

Typically the wet grip (WG) is measured using ISO4664-1:2011. In this generally accepted method tan delta at 0° C. is used as a measure for the wet grip. Preferably the tan delta at 0° C. for the reinforced elastomer according to the invention is at least 0.1250, more preferably at least 0.1500, more preferably at least 0.1775, even more preferably at least 0.1800, even more preferably at least 0.1825 and most preferably at least 0.1850.

To assess the rolling resistance (RRC), according to ISO4664-1:2011, tan delta at 60° C. is used as a measure. Preferably the tan delta at 60 °C for the reinforced elastomer according to the invention is at most 0.1350, more preferably at most 0.1300, even more preferably at most 0.1275, even more preferably at most 0.1250 and most preferably at most 0.1225.

A tyre according to the invention is very resistant to tread wear. To assess this property often the abrasion resistance as defined by the volume loss according to ISO 4649:2010 method A is used. The reinforced elastomer according to the invention preferably has a volume loss lower than 115 $mm^3$, more preferably 110 $mm^3$, even more preferably 105 $mm^3$, and most preferably 100 $mm^3$.

Preferably the reinforced elastomer according to the current invention has a stiffness as measured using the modulus 300% as defined by ISO37:2011 The modulus 300% of the reinforced elastomer according to the current invention is preferably at least 10 MPa, preferably at least 12 MPa, more preferably at least 14 MPa, even more preferably at least 16 MPa and most preferably at least 18 MPa.

The reinforced elastomer according to the current invention preferably has a tensile strength at max, as defined by ISO37:2011, of at least 20 MPa, more preferably at least 22 MPa, more preferably at least 24 MPa, even more preferably at least 26 MPa and most preferably at least 28 MPa.

Preferably the elongation at break of the reinforced elastomer according to the invention, as defined by ISO37:2011, of at least 350%, more preferably at least 400%, even more preferably at least 450%, even more preferably at least 475% and most preferably at least 500%.

The reinforced elastomer according to the current invention preferably has a tear strength, as defined by ISO34-1:2015, of at least 25 KN/m, more preferably at least 27 kN/m, even more preferably at least 29 kN/m and most preferably at least 30 kN/m.

In one embodiment, the networks are used for reducing heat build-up of reinforced elastomer.

The reinforced elastomer according to the current invention preferably has a heat build-up temperature rise, as defined by ISO 4666-3:2016 of maximum 30° C., more preferably at most 29° C., even more preferably at most 28° C. and most preferably at most 26° C. In a preferred embodiment, the reinforced elastomer exhibiting such heat build-up properties is essentially uncompromised in terms of at least one, more preferably at least two, even more preferably all of tensile strength (ISO37:2011), abrasion resistance (ISO 4649:2010) and rolling resistance (ISO4664-1:2011) as specified here above.

The reinforced elastomer according to the current invention preferably has a creep, as defined by ISO 4666-3:2016 of maximum 3%, more preferably maximum 2.9%, even more preferably maximum 2.6%.

The challenge with developing elastomers is often to improve on a certain property without compromising other properties. The carbon networks fulfil a need to reinforce elastomers yet improve or maintain the tan delta at 0° C. without compromising the tan delta at 60° C. and without compromising other properties such as abrasion resistance, modulus 300%, tensile strength at max, elongation at break and/or tear strength. When used in a tyre tread it is very beneficial to have a tan delta at 0° C. (wet grip) which is high and a tan delta at 60° C. (rolling resistance) which is low. Such a tread will allow for producing a tyre which has both a low rolling resistance—meaning more fuel economic— and a higher wet grip—meaning increased safety. It is therefore preferred that the reinforced elastomer complies with at least 4, more preferably at least 5, even more preferably at least 6, most preferably all of the following characteristics according to embodiment (a) in the table below:

|  | Preferred (a) | More preferred (b) | Even more preferred (c) | Most preferred (d) |
| --- | --- | --- | --- | --- |
| ISO4664-1:2011, tan delta at 0 (° C.) | ≥0.1250 | ≥0.1500 | ≥0.1775 | ≥0.1800 |
| ISO4664-1:2011, tan delta at 60 (° C.) | ≤0.1350 | ≤0.1300 | ≤0.1300 | ≤0.1275 |
| ISO4649:2010, volume loss (mm³) | <115 | <115 | <110 | <110 |
| ISO37:2011, tensile strength at max (MPa) | ≥22 | ≥24 | ≥26 | ≥28 |
| ISO37:2011, elongation at break (%) | ≥350 | ≥400 | ≥450 | ≥475 |
| ISO4666-3:2016, Temperature rise (heat build-up) (° C.) | ≤30 | ≤29 | ≤28 | ≤26 |
| ISO4666-3:2016, creep (%) | ≤3 | ≤2.9 | ≤2.8 | ≤2.6 |

These numbers apply to the properties of the reinforced elastomers.

It is particularly preferred that the reinforced elastomer complies with at least 4, more preferably at least 5, even more preferably at least 6, most preferably all of the characteristics according to embodiment (b) in the above table.

It is more preferred that the reinforced elastomer complies with at least 4, more preferably at least 5, even more preferably at least 6, most preferably all of the characteristics according to embodiment (c) in the above table.

It is most preferred that the reinforced elastomer complies with at least 4, more preferably at least 5, even more preferably at least 6, most preferably all of the characteristics according to embodiment (d) in the above table.

In one embodiment, the networks are used for improving conductivity of reinforced elastomer.

The reinforced elastomer according to the current invention preferably has a volume resistivity performance which is preferably less than 106 (1000000) which is perceived as static, wherein the reinforced elastomer exhibiting such improved conductivity is essentially uncompromised in terms of hardness. The volume resistivity is preferably at least one, more preferably at least two orders of magnitude lower than that of traditional carbon black. It is preferred that the reinforced elastomer having the advantageous volume resistivity performance is characterized with at least 4, more preferably at least 5, even more preferably at least 6, most preferably all of the characteristics according to embodiment (a) or (b) or (c) or (d) in the above table.

The use of the carbon networks for reinforcing elastomers makes it possible to provide a very though material that has high tensile strength. This means that the material is less likely to fail and thus last longer. For instance in the case of tyres this may result in longer lasting tyres that are more resistant to punctures. The same advantages also work for conveyor belts that can carry heavier loads without breaking, and which is more energy efficient due to the low rolling resistance. Furthermore the reinforced elastomer of the invention is very suitable for industrial rubber goods. The above described properties are suitable in many areas of industrial technology. For instance in the area of conveyor belts it is very useful to lower the rolling resistance to reduce the power required for driving the belt. Also the wet grip may be very useful as articles being transported on the belt may be less likely to fall from the belt. In addition having a high abrasion resistance and tear strength are considered useful in the area of conveyor belts. Similar the reinforced elastomer according to the invention is very suitable for use in (industrial) tubes. Also here a high abrasion resistance and high tear strength are considered useful.

The reinforced elastomer of the invention can also be used in any of the other applications where rubbers are normally used. Non-limiting examples of these applications include footwear such as soles and boots, moulded rubber parts, handle grips, plugs, caps, bumpers, diaphragms and shock pads.

Process for Obtaining Carbon-Nanofibre-Comprising Carbon Networks

A process for obtaining the porous, chemically interconnected, carbon-nanofibre-comprising carbon networks can be described best as a modified carbon black manufacturing process, wherein 'modified' is understood that a suitable oil, preferably an oil comprising at least 14 C atoms (>C14) such as carbon black feedstock oil (CBFS), is provided to the reaction zone of a carbon black reactor as part of a single-phase emulsion, being a thermodynamically stable microemulsion, comprising metal catalyst nanoparticles. The emulsion is preferably provided to the reaction zone by spraying, thus atomizing the emulsion to droplets. While the process can be carried out batch or semi-batch wise, the modified carbon black manufacturing process is advantageously carried out as a continuous process. The single-phase emulsion is a micro-emulsion comprising metal catalyst nanoparticles. The preferred single-phase emulsion comprises CBFS oil, and may be referred to as 'emulsified CBFS' in the context of the invention.

The process for the production of the carbon networks can be performed in a reactor 3 which contains a reaction zone 3b and a termination zone 3c, by injecting a single-phase emulsion c, being a micro-emulsion comprising metal catalyst nanoparticles, preferably a CBFS-comprising emulsion, into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce porous, chemically interconnected, carbon-nanofibre-comprising carbon networks, transferring these networks to the termination zone 3c, and quenching or stopping the formation of porous, chemically interconnected, carbon-nanofibre-comprising carbon networks in the termination zone by spraying in water d. The single-phase emulsion is preferably sprayed into the reaction zone. Reference is made to FIG. 1A.

Alternatively the process for the production of the porous, chemically interconnected, carbon-nanofibre-comprising carbon networks is performed in a furnace carbon black reactor 3 which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying (atomizing) a single-phase emulsion c according to the invention, preferably a micro-emulsion comprising metal catalyst nanoparticles, preferably a CBFS-comprising emulsion, in the reaction zone 3b containing the hot waste gas, carbonizing said emulsion at increased temperatures (at a temperature of above 600° C., preferably above 700° C., more preferably above 900° C., even more preferably above 1000° C., more preferably above 1100° C., preferably up to 3000° C., more preferably up to 2500° C., most preferably up to 2000° C.), and quenching or stopping the reaction (i.e. the formation of porous, chemically interconnected, carbon-nanofibre-comprising carbon networks) in the termination zone 3c by spraying in water d. The reaction zone 3b comprises at least one inlet (preferably a nozzle) for introducing the emulsion, preferably by atomization. Reference is made to FIG. 1A.

Residence times for the emulsion in the reaction zone of the furnace carbon black reactor can be relatively short, preferably ranging from 1-1000 ms, more preferably 10-100 ms. Longer residence times may have an effect on the properties of the carbon networks. An example may be the size of crystallites which is higher when longer residence times are used.

In accordance with conventional carbon black manufacturing processes, the oil phase can be aromatic and/or aliphatic, preferably comprising at least 50 wt. % C14 or higher, more preferably at least 70 wt. % C14 or higher (based on the total weight of the oil). List of typical oils which can be used, but not limited to obtain stable emulsions are carbon black feedstock oils (CBFS), phenolic oil, anthracene oils, (short-medium-long chain) fatty acids, fatty acids esters and paraffins. The oil is preferably a C14 or higher. In one embodiment, the oil preferably has high aromaticity. Within the field, the aromaticity is preferably characterized in terms of the Bureau of Mines Correlation Index (BMCI). The oil preferably has a BMCI >50. In one embodiment, the oil is low in aromaticity, preferably having a BMCI <15.

CBFS is an economically attractive oil source in the context of the invention, and is preferably a heavy hydrocarbon mix comprising predominantly C14 to C50, the sum of C14-C50 preferably amounting to at least 50 wt. %, more preferably at least 70 wt. % of the feedstock. Some of the most important feedstocks used for producing carbon black include clarified slurry oil (CSO) obtained from fluid catalytic cracking of gas oils, ethylene cracker residue from naphtha steam cracking and coal tar oils. The presence of paraffins (<C15) substantially reduces their suitability, and a higher aromaticity is preferred. The concentration of aromatics determines the rate at which carbon nuclei are formed. The carbon black feedstock preferably has a high BMCI to be able to offer a high yield with minimum heat input hence reducing the cost of manufacturing. In a preferred embodiment, and in accordance with current CBFS specifications, the oil, including mixtures of oil, has a BMCI value of more than 120. While the skilled person has no difficulties understanding which are suitable CBFS, merely as a guide it is noted that—from a yield perspective—a BMCI value for CBFS is preferably more than 120, even more preferably more than 132. The amount of asphaltene in the oil is preferably lower than 10 wt. %, preferably lower than 5.0 wt. % of the CBFS weight. The CBFS preferably has low sulphur content, as sulphur adversely affects the product quality, leads to lower yield and corrodes the equipment.

It is preferred that the sulphur content of the oil according to ASTM D1619 is less than 8.0 wt. %, preferably below 4.0 wt. % more preferably less than 2.0 wt. %.

The emulsion, preferably a CBFS-comprising emulsion, is a "single-phase emulsion" which is understood to mean that the oil phase and the water phase optically appear as one miscible mixture showing no physical separation of oil, water or surfactant to the naked eye. The single-phase emulsion can be a macro-emulsion or a micro-emulsion, and can be either kinetically or thermodynamically stable. The process by which an emulsion completely breaks (coalescence), i.e. the system separates into bulk oil and water phases, is generally considered to be controlled by four different droplet loss mechanisms, i.e., Brownian flocculation, creaming, sedimentation flocculation and disproportionation.

A 'stable single-phase emulsion' within the context of the invention is understood to mean that the emulsion shows no physical separation visible to the eye, preferably reflected in terms of the emulsion not showing any change in pH by more than 1.0 pH unit and/or the emulsion not showing any change in viscosity by more than 20%, over a period of time that exceeds the carbon network production time. The term 'stable' can mean 'thermodynamically stable' or 'kinetically stable' (by adding energy, i.e. through mixing). In practice, the single-phase emulsion is regarded stable if no de-mixing optically arises, i.e. a single-phase is retained, for a period of at least 1 minute after preparation of the emulsion. It is thus preferred that the emulsion maintains its pH within 1.0 pH unit and/or its viscosity with less than 20% variation over a period of time of at least 1 minute, preferably at least 5 minutes after preparation. While for handling purposes an extended stability is preferred, it is noted that the manufacturing process can still benefit from using emulsions stable over relatively short time spans of 1 minute, preferably 5 minutes: By adding energy (mixing) the stability of the emulsion can be extended, and short-term stability can be extended using in-line mixing. While macro-emulsions are not thermodynamically stable, and will always revert to their original, immiscible separate oil and water phases, the break down rate can be sufficiently slow to render it kinetically stable for the length of the manufacturing process.

Provided that a stable, single-phase emulsion is obtained, the amounts of water and oil are not regarded limiting, but it is noted that reduced amounts of water (and increased amounts of oil) improve yields. The water content is typically between 5 and 50 wt % of the emulsion, preferably 10-40 wt %, even more preferably up to 30 wt %, more preferably 10-20 wt % of the emulsion. While higher amounts of water can be considered, it will be at the cost of yield. Without wishing to be bound by any theory, the inventors believe that the water phase attributes to the shape and morphology of the networks thus obtained.

The choice of surfactant(s) is not regarded a limiting factor, provided that the combination of the oil, water and surfactant(s) results in a stable micro-emulsion as defined here above. As further guidance to the skilled person, it is noted that the surfactant can be selected on the basis of the hydrophobicity or hydrophilicity of the system, i.e. the hydrophilic-lipophilic balance (HLB). The HLB of a surfactant is a measure of the degree to which it is hydrophilic or lipophilic, determined by calculating values for the different regions of the molecule, according to the Griffin or Davies method. The appropriate HLB value depends on the type of oil and the amount of oil and water in the emulsion, and can be readily determined by the skilled person on the basis of the requirements of retaining a thermodynamically stable, single phase emulsion as defined above. It is found that an emulsion comprising more than 50 wt % oil, preferably having less than 30 wt % water phase, would be stabilized best with a surfactant having an HLB value above 7, preferably above 8, more preferably above 9, most preferably above 10. On the other hand, an emulsion with at most 50 wt % oil would be stabilized best with a surfactant having an HLB value below 12, preferably below 11, more preferably below 10, most preferably below 9, particularly below 8. The surfactant is preferably selected to be compatible with the oil phase. In case the oil is a CBFS-comprising emulsion with a CBFS, a surfactant with high aromaticity is preferred, while an oil with low BMCI, such as characterized by BMCI <15, would be stabilized best using aliphatic surfactants. The surfactant(s) can be cationic, anionic or non-ionic, or a mixture thereof. One or more non-ionic surfactants are preferred, in order to increase the yields since no residual ions will be left in the final product. In order to obtain a clean tail gas stream, the surfactant structure is preferably low in sulfur and nitrogen, preferably free from sulfur and nitrogen. Non-limiting examples of typical non-ionic surfactants which can be used to obtain stables emulsions are commercially available series of Tween, Span, Hypermer, Pluronic, Emulan, Neodol, Triton X and Tergitol.

In the context of the invention, a micro-emulsion is a dispersion made of water, oil (preferably CBFS), and surfactant(s) that is a single optically and thermodynamically stable liquid with dispersed domain diameter varying approximately from 1 to 500 nm, preferably 1 to 100 nm, usually 10 to 50 nm. In a micro-emulsion the domains of the dispersed phase are either globular (i.e. droplets) or interconnected (to give a bicontinuous micro-emulsion). In a preferred embodiment, the surfactant tails form a continuous network in the oil-phase of a water-in-oil (w/o) emulsion or bicontinuous emulsion. The water domains should contain a metal catalyst, preferably having an average particle size between 1 nm and 100 nm.

The single-phase emulsion, i.e. a w/o or bicontinuous micro-emulsion, preferably a bicontinuous micro-emulsion, further comprises metal catalyst nanoparticles preferably having an average particle size between 1 and 100 nm. The skilled person will find ample guidance in the field of carbon nanotubes (CNTs) to produce and use these kinds of nanoparticles. These metal nanoparticles are found to improve network formation in terms of both rates and yields, and reproducibility. Methods for manufacturing suitable metal nanoparticles are found in Vinciguerra et al. "Growth mechanisms in chemical vapour deposited carbon nanotubes" Nanotechnology (2003) 14, 655; Perez-Cabero et al. "Growing mechanism of CNTs: a kinetic approach" J. Catal. (2004) 224, 197-205; Gavillet et al. "Microscopic mechanisms for the catalyst assisted growth of single-wall carbon nanotubes" Carbon. (2002) 40, 1649-1663 and Amelinckx et al. "A formation mechanism for catalytically grown helix-shaped graphite nanotubes" Science (1994) 265, 635-639, their contents about manufacturing metal nanoparticles herein incorporated by reference.

The metal catalyst nanoparticles are used in a bicontinuous or w/o microemulsion, preferably a CBFS-comprising bicontinuous or w/o micro-emulsion. In one embodiment, a bicontinuous micro-emulsion is most preferred. Advantageously, the uniformity of the metal particles is controlled in said (bicontinuous) micro-emulsion by mixing a first (bicontinuous) micro-emulsion in which the aqueous phase contains a metal complex salt capable of being reduced to the ultimate metal particles, and a second (bicontinuous) micro-emulsion in which the aqueous phase contains a reductor capable of reducing said metal complex salt; upon mixing the metal complex is reduced, thus forming metal particles. The controlled (bicontinuous) emulsion environment stabilizes the particles against sintering or Ostwald ripening. Size, concentrations and durability of the catalyst particles are readily controlled. It is considered routine experimentation to tune the average metal particle size within the above range, for instance by amending the molar ratio of metal precursor vs. the reducing agent. An increase in the relative amount of reducing agent yields smaller particles. The metal particles thus obtained are monodisperse, deviations from the average particle size are preferably within 10%, more preferably within 5%. Also, the present technology provides no restraint on the actual metal precursor, provided it can be reduced. Non-limiting examples of nanoparticles included in the carbon-nanofibre-comprising carbon networks are the noble metals (Pt, Pd, Au, Ag), iron-family elements (Fe, Co and Ni), Ru, and Cu. Suitable metal complexes may be (i) platinum precursors such as $H_2PtCl_6$; $H_2PtCl_6 \cdot xH_2O$; $K_2PtCl_4$; $K_2PtCl_4 \cdot xH_2O$; $Pt(NH_3)_4(NO_3)_2$; $Pt(C_5H_7O_2)_2$, (ii) ruthenium precursors such as $Ru(NO)(NO_3)_3$; $Ru(dip)_3Cl_2$ [dip=4,7-diphenyl-1,10-fenanthroline]; $RuCl_3$, or (iii) palladium precursors such as $Pd(NO_3)_2$, or (iv) nickel precursors such as $NiCl_2$ or $NiCl_2 \cdot xH_2O$; $Ni(NO_3)_2$; $Ni(NO_3)_2 \cdot xH_2O$; $Ni(CH_3COO)_2$; $Ni(CH_3COO)_2 \cdot xH_2O$; $Ni(AOT)_2$ [AOT=bis(2-ethylhexyl)sulphosuccinate], wherein x may be any integer chosen from 1, 2, 3, 4, 5, 6, 7, 8, 9 or 10 and typically is 6, 7 or 8. Non-limiting suitable reducing agents are hydrogen gas, sodium boron hydride, sodium bisulphate, hydrazine or hydrazine hydrate, ethylene glycol, methanol and ethanol. Also suited are citric acid and dodecylamine. The type of metal precursor is not an essential part of the invention. The metal of the particles of the (bicontinuous) micro-emulsion are preferably selected from the group consisting of Pt, Pd, Au, Ag, Fe, Co, Ni, Ru and Cu, and mixtures thereof, in order to control morphology of the carbon structures networks ultimately formed. The metal nanoparticles end up embedded inside these structures where the metal particles are physically attached to the structures. While there is no minimum concentration of metal particles at which these networks are formed—in fact networks are formed using the modified carbon black manufacturing process according to the invention—it was found that the yields increase with the metal particle concentrations. In a preferred embodiment, the active metal concentration is at least 1 mM, preferably at least 5 mM, preferably at least 10 mM, more preferably at least 15 mM, more preferably at least 20 mM, particularly at least 25 mM, most preferably up to 3500 mM, preferably up to 3000 mM. In one embodiment, the metal nanoparticles comprise up to 250 mM. These are concentrations of the catalyst relative to the amount of the aqueous phase of the (bicontinuous) micro-emulsion.

Atomization of the single-phase emulsion, preferably a CBFS-comprising emulsion, is preferably realized by spraying, using a nozzle-system 4, which allows the emulsion droplets to come in contact with the hot waste gas a1 in the reaction zone 3b, resulting in traditional carbonization, network formation and subsequent agglomeration, to produce carbon networks according to the invention. The injection step preferably involves increased temperatures above 600° C., preferably between 700 and 3000° C., more preferably between 900 and 2500° C., more preferably between 1100 and 2000° C.

In one aspect, the porous, chemically interconnected, carbon-nanofibre-comprising carbon networks preferably have at least one, preferably at least two, more preferably at least three, most preferably all of the following properties:
  (i) Iodine Adsorption Number (IAN) of at least 30 mg/g, preferably at least 50 mg/g, more preferably at least 100 mg/g, and most preferably at least 150 mg/g according to ASTM D1510. Alternatively the IAN is 30-1000 mg/g, preferably 100-800 mg/g and more preferably 30-500 mg/g according to ASTM D1510;
  (ii) Nitrogen Surface Area (N2SA) at least 30 $m^2/g$, preferably at least 50 $m^2/g$, more preferably at least 100 $m^2/g$, and most preferably at least 150 $m^2/g$ according to ASTM D6556. Alternatively N2SA is 30-1000 $m^2/g$, preferably 100-800 $m^2/g$ and more preferably 30-500 $m^2/g$ according to ASTM D6556;
  (iii) Statistical Thickness Surface Area (STSA) of at least 40 $m^2/g$, more preferably at least 70 $m^2/g$, even more preferably at least 100 $m^2/g$, even more preferably at least 125 $m^2/g$, and most preferably at least 150 $m^2/g$ according to ASTM D6556. Alternatively STSA is 40-1000 $m^2/g$, preferably 100-800 $m^2/g$ and more preferably 120-500 $m^2/g$, according to ASTM D6556;
  (iv) Oil Absorption Number (OAN) of at least 50 cc/100 g, preferably at least 75 cc/100 g, more preferably at least 100 cc/100 g, even more preferably at least 125 cc/100 g, and most preferably at least 150 cc/100 g according to ASTM D2414. Alternatively OAN is 50-500 cc/100 g, preferably 150-350 cc/100 g according to ASTM D2414,
wherein:
  IAN=Iodine Adsorption Number: the number of grams of iodine adsorbed per kilogram of carbon black under specified conditions as defined in ASTM D1510;
  N2SA=nitrogen surface area: the total surface area of carbon black that is calculated from nitrogen adsorption data using the B.E.T. theory, according to ASTM D6556;
  STSA=statistical thickness surface area: the external surface area of carbon black that is calculated from nitrogen adsorption data using the de Boer theory and a carbon black model, according to ASTM D6556; and
  OAN=Oil Absorption Number: the number of cubic centimeters of dibutyl phthalate (DBP) or paraffin oil absorbed by 100 g of carbon black under specified conditions. The OAN value is proportional to the degree of aggregation of structure level of the carbon black, determined according to ASTM D2414.

For each of IAN, N2SA (or NSA), STSA and OAN—all typical parameters for characterizing carbon black materials—the porous, chemically interconnected, carbon-nanofibre-comprising carbon networks exhibit superior properties compared to traditional carbon black. The porous, chemically interconnected, carbon-nanofibre-comprising carbon networks are preferably characterized by at least one, preferably at least two, more preferably all of (i), (ii) and (iii) since these are typical ways of characterized the surface area properties of the materials. In one embodiment, the porous, chemically interconnected, carbon-nanofibre-comprising carbon networks exhibit at least one of (i), (ii) and (iii), and further comply with (iv).

Example: Properties of Carbon Networks in SBR

The performance of styrene-butadiene rubber reinforced with carbon networks according to the invention ('carbon networks') has been compared with the performance of rubbers reinforced with a known grade of carbon black supplied by Cabot Corporation (N115). The carbon networks were used as prepared similar to the manufacturing process of example 1 in WO2018/002137, its contents herein incorporated by reference. The networks had an average intraparticle pore diameter size as measured using Mercury Intrusion Porosimetry (ASTM D4404-10) of 20 nm. Commercially such SBR compounds are used as reinforced components, either in the carcass of a tire or in industrial rubbers. The performance was evaluated according to the ASTM D3191, which describes the formulation, processing and test methods for the evaluation and production control of Carbon blacks. The standards used for measuring the properties of the elastomer compounds are listed in Table 1.

Compounds were prepared by mixing 100 phr Europrene 1502, 50 phr of carbon network or carbon black, 3 phr zinc oxide, 1 phr stearic acid, 1.75 phr sulphur, and 1 phr TBBS. The main ingredients were mixed stage-wise: at t=0 minutes: add all Europrene, t=1 min: add 50% of the carbon networks or the carbon black, zinc oxide and stearic acid, t=2:30 min: add the remaining 50% of the carbon networks or the carbon black, t=4 min: sweep, and t=5 min dump. The rotor speed was constant at 75 rpm. Starting temperature was 50° C. and dump temperature was about 160° C. The load factor of the mixer (a Banbury type, 1.6 litre, Farrel Bridge) was 70%. The vulcanizing agents (sulphur and TBBS) were additionally mixed into the compound on a two-roll mill (1 litre, Agila) at 50° C. Tests samples were vulcanized at 160° C. and in electrically heated Fontijne Holland Presses and conditioned for 24 hours at 23° C. before testing.

The reinforced elastomers were tested according to the standards as given by Table 1. Results of the tests are shown in Table 2. In Table 2 it can be seen that the carbon networks according to the invention have a high tan delta at 0° C. combined with a low tan delta at 60° C., which means improved rolling resistance [RRC] in combination with wet grip [WG] and without compromising other key vectors such as abrasion resistance (measured in volume loss), tensile strength and elongation. Hence the carbon network of the invention allow for production of products such as tyres or conveyor belts that have a low rolling resistance resulting in gain in energy consumption, without compromising other properties. The carbon network of the invention allow for production of tyres or conveyor belts that are more durable, stronger and less prone to break upon elongation.

TABLE 1 standards used for measuring the properties of the elastomer compounds.

| Specs | Standard |
|---|---|
| Tan delta 0° C. | ISO4664-1:2011 |
| Tan delta 60° C. | ISO4664-1:2011 |
| Volume Loss | ISO 4649:2010 method A |
| Tensile Strength at Max | ISO37:2011 |
| Elongation at break | ISO37:2011 |
| Temperature Rise | ISO 4666-3:2016 |
| Creep | ISO 4666-3:2016 |

TABLE 2

Properties of the elastomer compounds

| Specs | Tan delta 0° C. (WG) | Tan delta 60° C. (RRC) | Volume Loss [mm³] | Tensile Strength at Max [MPa] | Elongation at break [%] | Temperature Rise (Heat build-up) [° C.] | Creep [%] |
|---|---|---|---|---|---|---|---|
| N115 | 0.1866 | 0.1441 | 108 | 27.4 | 457 | 33.7 | 3.3 |
| Carbon networks | 0.1852 | 0.1272 | 108 | 28.9 | 503 | 25.6 | 2.5 |

It was also found that the same carbon networks decreased volume resistivity performance by 3 orders of magnitude at the same hardness levels than N115:

TABLE 3 volume resistivity

| | Amount [phr] | Hardness [Shore A] | Volume resistivity [ohm.cm] |
|---|---|---|---|
| N115 | 50 | 66 | $10^{+6}$ (1000000) |
| Carbon networks | 60 | 67 | $10^{+3}$ (1000) |

Example: Properties of Carbon Networks in Natural Rubber (NR)

The performance of natural rubber reinforced with carbon networks according to the invention ('carbon networks') has been compared with the performance of rubbers reinforced with a known grade of carbon black supplied by Cabot Corporation (N115, N550). The carbon networks were used as prepared similar to the manufacturing process of example 1 in WO2018/002137, its contents herein incorporated by reference. The networks had an average intraparticle pore diameter size as measured using Mercury Intrusion Porosimetry (ASTM D4404-10) of 20 nm. Commercially such NR compounds are used as reinforced components, either in the tread of a tire or in industrial rubbers. The performance was evaluated according to the ASTM D3192, which describes the formulation, processing and test methods for the evaluation and production control of Carbon blacks. The standards used for measuring the properties of the elastomer compounds are listed in Table 1.

Compounds were prepared by mixing 100 phr TSR-10, 50 phr of carbon network or carbon black, 5 phr zinc oxide, 3 phr stearic acid, 2.5 phr sulphur, and 0.6 phr MBTS. The main ingredients were mixed stage-wise: at t=0 minutes: add all NR, t=1 min: add 50% of the carbon networks or the carbon black, zinc oxide and stearic acid, t=2:30 min: add the remaining 50% of the carbon networks or the carbon black, t=4 min: sweep, and t=5 min dump. The rotor speed was constant at 75 rpm. Starting temperature was 50° C. and dump temperature was about 160° C. The load factor of the mixer (a Banbury type, 1.6 litre, Farrel Bridge) was 70%. The vulcanizing agents (sulphur and MBTS) were additionally mixed into the compound on a two-roll mill (1 litre, Agila) at 50° C. Tests samples were vulcanized at 160° C. and in electrically heated Fontijne Holland Presses and conditioned for 24 hours at 23° C. before testing.

The reinforced elastomers were tested according to the standards as given by Table 4.

Results of the tests are shown in Table 5. In Table 5 it can be seen that the carbon networks according to the invention have a lower tan delta at 60° C. combined with an improvement in tensile strength, elongation and tear strength. Hence the carbon network of the invention allow for production of products such as tyres or conveyor belts that have a low rolling resistance resulting in gain in energy consumption, without compromising other properties. The carbon network of the invention allow for production of tyres or conveyor belts that are more durable, stronger and less prone to break upon elongation. Moreover, the performance has been compared to N550 (carbon black, Carbot Corporation), generally used for instance in hoses. The results of table 6 suggests improved flexibility and abrasion resistance.

TABLE 4 standards used for measuring the properties of the elastomer compounds.

| Specs | Standard |
|---|---|
| Tan delta 60° C. | ISO4664-1:2011 |
| Volume Loss | ISO 4649:2010 method A |
| Tensile Strength at Max | ISO37:2011 |
| Elongation at break | ISO37:2011 |
| Tear strength | ISO 34-1:2015 |

TABLE 5

Tear, tensile properties, hysteresis in NR (ASTM D3192) at same abrasion resistance.

| | Tensile strength [MPa] | Elongation [%] | Tear strength at 23 C [kN/m] | Abrasion resistance (volume loss) [mm³] | Tanδ-60 C. |
|---|---|---|---|---|---|
| N115 | 28.2 | 592 | 94 | 153 | 0.1075 |
| Carbon networks | 29.0 | 616 | 104 | 155 | 0.1057 |

TABLE 6

Improvement in abrasion resistance and mechanical properties for hoses applications.

| | Carbon networks | N550 |
|---|---|---|
| Tensile strength [MPa] | 27.7 | 25.7 |
| elongation [%] | 522 | 488 |
| Mod100 [MPa]* | 2.7 | 3.2 |

TABLE 6-continued

Improvement in abrasion resistance and
mechanical properties for hoses applications.

|  | Carbon networks | N550 |
|---|---|---|
| Mod300 [MPa]* | 13.6 | 14.9 |
| MRI* | 5.04 | 4.66 |
| Abrasion resistance [mm³] | 125 | 148 |
| Mooney Viscosity [MU] | 57 | 62 |

*Mod100 is the stress required to elongate the sample 100%; Mod300 is the stress required to elongate the sample 300%; MRI = MOD300/MOD100.

The invention claimed is:

1. A reinforced elastomer comprising 10-60 wt. % or 10-120 phr of a porous carbon network which comprises chemically interconnected carbon-nanofibres, wherein the carbon network is an intraparticle porous network wherein the carbon nanofibers are interconnected to other carbon nanofibers in the network by chemical bonds via junctions, wherein the pores in the network have an intraparticle pore diameter size of 5-150 nm using Mercury Intrusion Porosimetry according to ASTM D4404-10, wherein at least 20 wt % of the carbon in the carbon networks is in crystalline form, and the carbon nanofibers have an average aspect ratio of fibre length-to-thickness of at least 2.

2. The reinforced elastomer of claim 1, wherein the reinforced elastomer complies with at least 4 of the following characteristics in the table below:

| ISO4664-1:2011, tan delta at 0 (° C.) | ≥0.1250 |
|---|---|
| ISO4664-1:2011, tan delta at 60 (° C.) | ≤0.1350 |
| ISO4649:2010, volume loss (mm³) | <115 |
| ISO37:2011, tensile strength at max (MPa) | ≥22 |
| ISO37:2011, elongation at break (%) | ≥350 |
| ISO4666-3:2016, Temperature rise (heat build-up) (° C.) | ≤30 |
| ISO4666-3:2016, creep (%) | ≤3. |

3. The reinforced elastomer of claim 1, wherein the reinforced elastomer complies with at least 4 of the following characteristics in the table below:

| ISO4664-1:2011, tan delta at 0 (° C.) | ≥0.1500 |
|---|---|
| ISO4664-1:2011, tan delta at 60 (° C.) | ≤0.1300 |
| ISO4649:2010, volume loss (mm³) | <115 |
| ISO37:2011, tensile strength at max (MPa) | ≥24 |
| ISO37:2011, elongation at break (%) | ≥400 |
| ISO4666-3:2016, Temperature rise (heat build-up) (° C.) | ≤29 |
| ISO4666-3:2016, creep (%) | ≤2.9. |

4. The reinforced elastomer of claim 1, wherein the carbon network is obtainable by a process for producing crystalline carbon networks in a reactor 3 which contains a reaction zone 3b and a termination zone 3c, by injecting a water-in-oil or bicontinuous micro-emulsion c comprising metal catalyst nanoparticles, into the reaction zone 3b which is at a temperature of above 600° C. to produce crystalline carbon networks e, transferring these networks e to the termination zone 3c, and quenching or stopping the formation of crystalline carbon networks in the termination zone by spraying in water d.

5. An article of manufacture comprising the reinforced elastomer of claim 1.

6. The article of manufacture according to claim 5, which is a tyre or industrial rubber good.

7. The reinforced elastomer of claim 2, wherein the reinforced elastomer complies with at least 5, of the following characteristics in the table below:

| ISO4664-1:2011, tan delta at 0 (° C.) | ≥0.1250 |
|---|---|
| ISO4664-1:2011, tan delta at 60 (° C.) | ≤0.1350 |
| ISO4649:2010, volume loss (mm³) | <115 |
| ISO37:2011, tensile strength at max (MPa) | ≥22 |
| ISO37:2011, elongation at break (%) | ≥350 |
| ISO4666-3:2016, Temperature rise (heat build-up) (° C.) | ≤30 |
| ISO4666-3:2016, creep (%) | ≤3. |

8. The reinforced elastomer of claim 3, wherein the reinforced elastomer complies with at least 5 of the following characteristics in the table below:

| ISO4664-1:2011, tan delta at 0 (° C.) | ≥0.1500 |
|---|---|
| ISO4664-1:2011, tan delta at 60 (° C.) | ≤0.1300 |
| ISO4649:2010, volume loss (mm³) | <115 |
| ISO37:2011, tensile strength at max (MPa) | ≥24 |
| ISO37:2011, elongation at break (%) | ≥400 |
| ISO4666-3:2016, Temperature rise (heat build-up) (° C.) | ≤29 |
| ISO4666-3:2016, creep (%) | ≤2.9. |

9. The reinforced elastomer of claim 7, wherein the reinforced elastomer complies with all of the following characteristics in the table below:

| ISO4664-1:2011, tan delta at 0 (° C.) | ≥0.1250 |
|---|---|
| ISO4664-1:2011, tan delta at 60 (° C.) | ≤0.1350 |
| ISO4649:2010, volume loss (mm³) | <115 |
| ISO37:2011, tensile strength at max (MPa) | ≥22 |
| ISO37:2011, elongation at break (%) | ≥350 |
| ISO4666-3:2016, Temperature rise (heat build-up) (° C.) | ≤30 |
| ISO4666-3:2016, creep (%) | ≤3. |

10. The reinforced elastomer of claim 8, wherein the reinforced elastomer complies with at all of the following characteristics in the table below:

| ISO4664-1:2011, tan delta at 0 (° C.) | ≥0.1500 |
|---|---|
| ISO4664-1:2011, tan delta at 60 (° C.) | ≤0.1300 |
| ISO4649:2010, volume loss (mm³) | <115 |
| ISO37:2011, tensile strength at max (MPa) | ≥24 |
| ISO37:2011, elongation at break (%) | ≥400 |
| ISO4666-3:2016, Temperature rise (heat build-up) (° C.) | ≤29 |
| ISO4666-3:2016, creep (%) | ≤2.9. |

11. The reinforced elastomer of claim 4, wherein the reaction zone 3b is at a temperature of above 700° C.

12. The reinforced elastomer of claim 11, wherein the reaction zone 3b is at a temperature of above 1000° C.

13. The reinforced elastomer of claim 4, wherein the reaction zone 3b is at a temperature of up to 2500° C.

14. The reinforced elastomer of claim 4, wherein the reaction zone 3b is at a temperature of up to 2000° C.

* * * * *